United States Patent
Kapoor et al.

(10) Patent No.: US 9,384,022 B1
(45) Date of Patent: Jul. 5, 2016

(54) AUTOMATING DISPLAY MODES OF FILES WITHIN A VIRTUAL MACHINE

(71) Applicant: Bromium, Inc., Cupertino, CA (US)

(72) Inventors: Vikram Kapoor, Cupertino, CA (US); Deepak Khajuria, San Jose, CA (US)

(73) Assignee: Bromium, Inc., Cupertino, CA (US)

( * ) Notice: Subject to any disclaimer, the term of this patent is extended or adjusted under 35 U.S.C. 154(b) by 330 days.

(21) Appl. No.: 13/945,177

(22) Filed: Jul. 18, 2013

(51) Int. Cl.
*G06F 9/455* (2006.01)

(52) U.S. Cl.
CPC .................................. *G06F 9/45533* (2013.01)

(58) Field of Classification Search
None
See application file for complete search history.

(56) References Cited

U.S. PATENT DOCUMENTS

| | | | |
|---|---|---|---|
| 2009/0125902 A1* | 5/2009 | Ghosh et al. | 718/1 |
| 2012/0081292 A1* | 4/2012 | Sirpal et al. | 345/169 |
| 2013/0265317 A1* | 10/2013 | Wu | 345/501 |
| 2013/0291062 A1* | 10/2013 | Bursell | G06F 21/44 726/4 |
| 2014/0082051 A1* | 3/2014 | Yu et al. | 709/203 |

* cited by examiner

*Primary Examiner* — Tammy Lee
(74) *Attorney, Agent, or Firm* — Brokaw Patent Law PC; Christopher J. Brokaw

(57) ABSTRACT

Approaches for rendering a file within a display mode. A guest module, executing within a virtual machine, determines that a process executing within the virtual machine is requesting to display a file. The guest module sends a request to display the file to a host module which executes within a host operating system. After the host module receives the request, the host module determines whether a user initiated the display of the file. Upon the host module determining that the file is permitted to be displayed, the host module determines a particular display mode for the file. Thereafter, the host module causes the file to be displayed in the particular display mode. Files may be automatically displayed in a configurable display mode in a secure manner.

18 Claims, 3 Drawing Sheets

AUTOMATING DISPLAY MODES OF FILES WITHIN A VIRTUAL MACHINE

RELATED APPLICATION DATA

This application is related to U.S. non-provisional patent application Ser. No. 13/115,354, filed May 25, 2011, entitled "Approaches for Securing an Internet Endpoint using Fine-Grained Operating System Virtualization," invented by Gaurav Banga et al., which claims priority to U.S. provisional patent application No. 61/349,717, filed May 28, 2010, entitled "System and Method for Securing an Internet Endpoint using fine-grained Full OS Virtualization," invented by Gaurav Banga, the contents of which are hereby incorporated by reference for all purposes as if fully set forth herein.

This application is also related to U.S. non-provisional patent application Ser. No. 13/223,091, filed Aug. 31, 2011, entitled "Approaches for Automated Management of Virtual Machines for Running Untrusted Code Safely," invented by Gaurav Banga et al., the contents of which are hereby incorporated by reference for all purposes as if fully set forth herein.

This application is also related to U.S. non-provisional patent application Ser. No. 13/419,345, filed Mar. 13, 2012, entitled "Seamless Management of Untrusted Data Using Virtual Machines," invented by Gaurav Banga et al., the contents of which are hereby incorporated by reference for all purposes as if fully set forth herein.

FIELD OF THE INVENTION

Embodiments of the invention relate to automating the display mode of executable and non-executable files residing in a virtual machine.

BACKGROUND

Files may be rendered in a variety of display modes. An example of a common display mode is a full screen mode. When in full screen mode, a file is rendered using the entirety of an available display. If a file is rendered using less than the entirety of the available display, then the file is said to be displayed in a non-full screen mode. There are many different types of non-full screen modes, such as cascade mode, tile mode, and multi-monitor mode.

In the present state of the art, there are techniques which allow one to manually display a file in a particular display mode. However, it is also presently possible for malicious code to, without the user's knowledge or consent, cause a certain file to be displayed in a particular display mode for a nefarious purpose. For example, a malicious program may cause a certain user interface to be rendered in a full screen mode in a manner that masquerades as a trusted user interface on the user's computer. The user will likely not detect that his or her user interface has been compromised. In this way, the malicious program may gain access to sensitive information entered by the user through the compromised user interface. Therefore, it would be desirable to prevent malicious code from having unfettered control over display modes of a computer.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for securely automating the display mode of executable and non-executable files residing in a virtual machine are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

Embodiments of the invention enable files to be automatically displayed in a configurable display mode. Embodiments also provide for files to be displayed in a particular display mode in a secure manner. Advantageously, any malicious code which may be inadvertently present within a computer system employing an embodiment of the invention will not be able to display a file in an unauthorized display mode. Embodiments of the invention may also be deployed within computer systems comprises a plurality of virtual machines.

In an embodiment, prior to allowing a particular file to be displayed within a display mode, a determination is made as to whether a user initiated the display of the file. This determination is useful because it helps ensure that the display of any file is the result of a request originating from an actual user rather than the result of malicious code executing within the computer system. If a request to display the file is determined to originate from a user, then the file may be displayed in a display mode associated with the file type of the file. For example, certain types of files may automatically be displayed in a first display mode, whereas other types of files may automatically be displayed in a different display mode.

Using embodiments of the invention, files may be automatically and securely displayed in a particular display mode on a computer system, regardless of in which virtual machine the file actually resides.

System Overview

Figure 1:
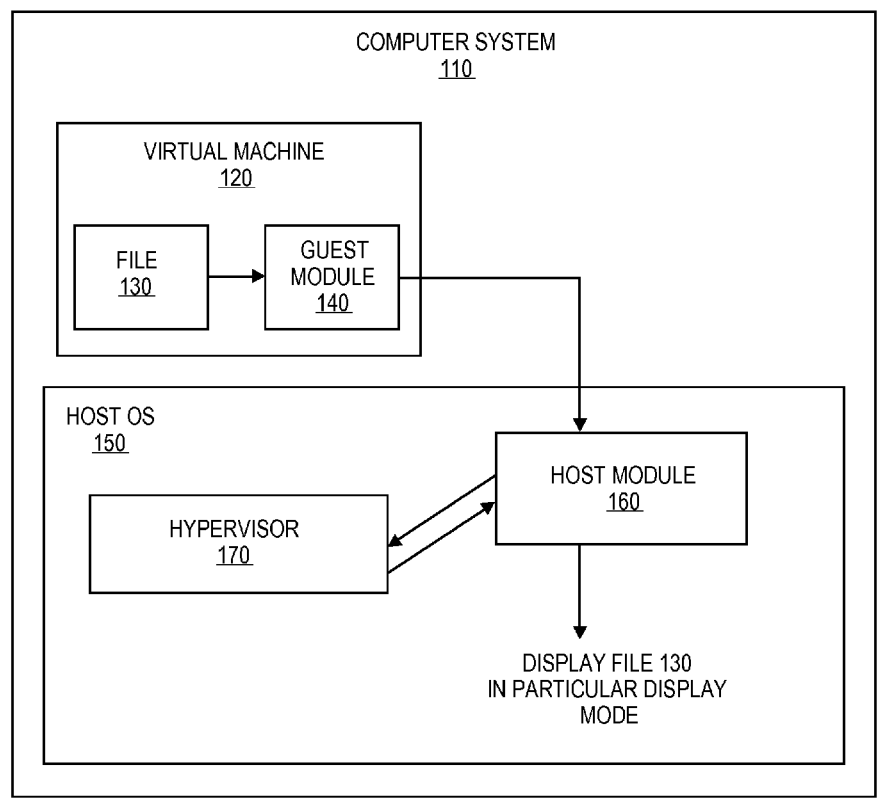
FIG. 1 is a block diagram of a system according to an embodiment of the invention.

FIG. 1 is a block diagram of system according to an embodiment of the invention. The system of FIG. 1 depicts computer system 110 that comprises a virtual machine 120 and host operating system 150. Host operating system 150, as broadly used herein, is intended to broadly represent any type of operating system which functions as the primary operating system installed upon computer system 110.

Virtual machine 120 is intended to represent a single virtual machine which is instantiated on computer system 110. While only a single virtual machine 120 is depicted in FIG. 1, computer system 110 may have a plurality of virtual machines instantiated simultaneously. Thus, embodiments of the invention may be employed with a computer system 110 having many instantiated virtual machines at any given time.

As shown in FIG. 1, virtual machine 120 comprises file 130 and guest module 140. File 130 is intended to broadly represent any single file which may be rendered or displayed by computer system 110. File 130 may correspond to a non-executable file that is interpreted by an application, such as a Microsoft Word document or an Adobe Acrobat document. File 130 may also correspond to an executable file that renders a display during its execution, such as an Adobe Flash file or an executable file having an ".EXE" file extension. While only a single file, i.e. file 130, is shown in FIG. 1 for clarity, those in the art shall appreciate that virtual machine 120 may comprise any number of files.

Guest module 140, as broadly used herein, represents a software module that resides in virtual machine 120 and coordinates with host module 160 to securely display file 130 in a particular display mode. Host module 160, as broadly used herein, represents a software module that resides in host operating system 150 and coordinates with guest module 140 to securely display file 130 in a particular display mode. The functions and responsibilities of both guest module 140 and host module 160 shall be discussed in greater detail below with reference to FIG. 2.

While hypervisor 170 is depicted in FIG. 1 as residing within host operating system 150, that need not be the case in every embodiment. Generally, there are two types of hypervisors, namely a Type 1 and a Type 2. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows.

Embodiments of the invention may use any type of hypervisor. Thus, while FIG. 1 depicts hypervisor 170 as being a Type 2 hypervisor, other embodiments of the invention not depicted in FIG. 1 may implement hypervisor 170 as a Type 1 hypervisor. In an embodiment where hypervisor 170 is implemented as a Type 1 hypervisor, hypervisor 170 will be implemented directly on the hardware of computer system 110 and may operate within a lower level of operation than host operating system 150.

Securely Automating Display Modes

Figure 2:
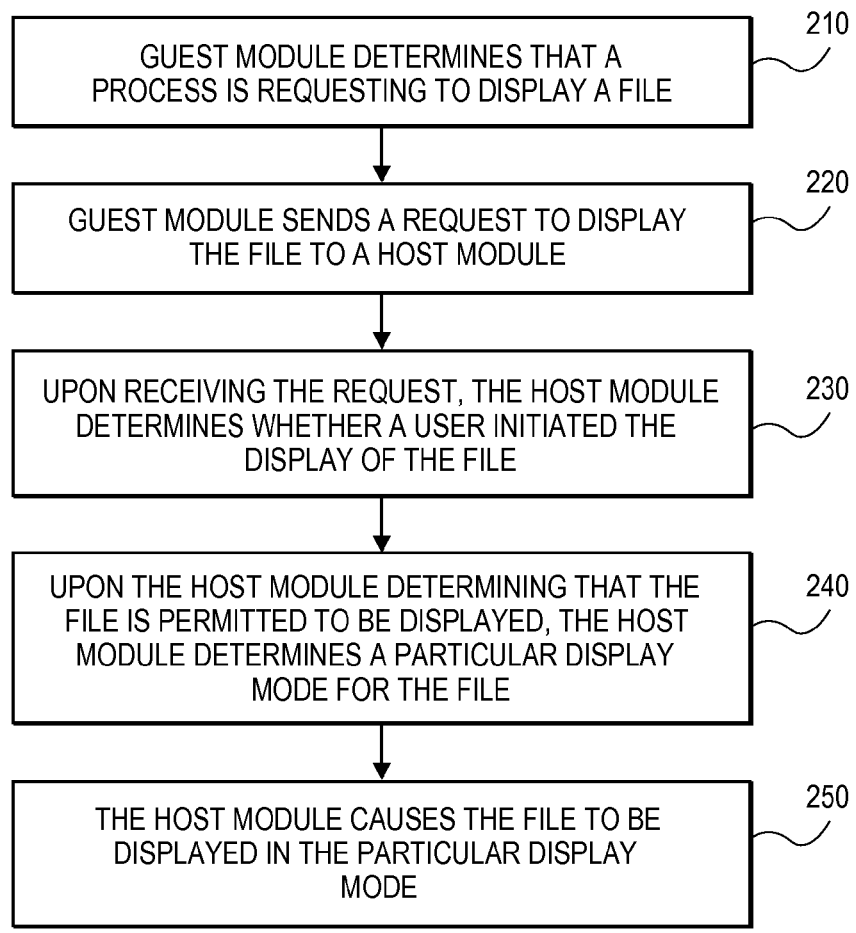
FIG. 2 is a flowchart illustrating the functional steps of securely and automatically displaying a file in a particular display mode according to an embodiment.

FIG. 2 is a flowchart illustrating the functional steps of securely and automatically displaying a file in a particular display mode according to an embodiment. In step 210, guest module 140 determines that a process executing within virtual machine 120 is requesting the display of file 130. Guest module 140 may determine that a process within virtual machine 120 is requesting the display of file 130 using a number of different mechanisms. For example, any request to display a file within virtual machine 120 may be redirected to guest module 140.

Another example of how guest module 140 may determine that a process within virtual machine 120 is requesting the display of file 130 is guest module 140 receiving notice from the host operation system that input was entered by the user to request file 130 to be displayed. In an embodiment, the host operating system has visibility into all the input that is being entered by user into the computer system, as user input flows from the host operating system to a responsible virtual machine, and thereafter, to an application executing within that virtual machine. Therefore, the host operating system can determine whether it has been notified or has detected that the user actually requested the display of file 130, and may subsequently notify guest module 140 when this happens.

A file may be displayed in a variety of different display modes. For example, a file may be displayed in a full screen mode. In full screen mode, a file is rendered using the entirety of an available display. If a file is rendered using less than the entirety of the available display, then the file or process is being displayed in a non-full screen mode. There are a variety of particular types of non-full screen modes. Several examples of a non-full screen mode are cascade mode, tile mode, and multi-monitor mode. In the cascade mode, two or more files may be displayed in an overlapping fashion on a single screen. In a tile mode, two or more files may be displayed in a non-overlapping fashion on a single screen. In a multi-monitor mode, a file may be displayed on one or more of a plurality of different physical display devices.

In step 220, guest module 140 sends a request to display file 130 to host module 160. Guest module 140 may, but need not, determine that a process is requesting to display file 130 in a particular display mode. If guest module 140 determines that the process is requesting to display file 130 in a particular display mode, then guest module 140 may, but need not, identify the particular display mode being requested in the request sent to host module 160.

In step 230, upon host module 160 receiving the request sent in step 220 from guest module 140, host module 160 determines whether a user initiated the display of file 130. In an embodiment, to determine if a user initiated the display of file 130, host module 160 communicates with hypervisor 170 to ascertain whether hypervisor 170 or the host operating system observed the user initiating the display of file 130 within a configurable amount of time. One way in which this may be performed is for hypervisor 170 to determine whether the user performed an operation against file 130 (such as, for example, a mouse down operation initiated by clicking a button on a mouse, a keystroke, input from a touch screen, and any other operation a user may perform to select a file) within a specified number of milliseconds. If the user did perform such an operation against file 130, then hypervisor 170 may conclude that the request to display file 130 did indeed originate from the user rather than a malicious program.

In step 230, host module 160 may also perform other security checks in addition to ensuring the request to display file 130 originated with the user. For example, in an embodiment, host module 160 may check access privileges associated with the requesting process or consult one or more configurable policies defining acceptable behavior on what type of files may be shown in particular display modes.

If the requesting process does not have sufficient access privileges to display the file, then host module 160 may determine that file 130 is not permitted to be displayed, and may alert the user. Similarly, if the request to display file 130 did not originate with the user or conflicts with a policy defining acceptable behavior, then host module 160 determines file 130 cannot be displayed and may alert the user and/or an administrator of computer system 110.

In step 240, upon host module 160 determining that the file is permitted to be displayed, host module 160 determines a particular display mode in which file 130 is to be displayed. Host module 160 may contain configuration data that defines one or more policies regarding whether a particular file may be displayed. For example, a policy may indicate that file 130 may only be displayed if a user initiated the display of file 130. The rationale behind such a policy is to prevent any malicious code from having the capability to cause a file to be displayed to the user.

However, policies accessed by host module 160 may define a number of permissible actions that may be performed against a one or more file types. For example, certain types of files may not be allowed to be viewed by certain users or users associated with certain characteristics. In this way, policies of arbitrary complexity may be defined to determine what types of files may be viewed and in what circumstances.

The policies consulted by host module 160 may define a particular display mode in which a file type is to be automatically displayed. To illustrate, a policy consulted by host module 160 in step 240 may instruct that all document or text file types be shown in tile display mode, the file type ".exe" be shown in full screen mode, and the ".ppt" file type be shown in multi-monitor mode.

In step 250, host module 160 causes the file to be displayed in the particular display mode determined in step 240. To do so, host module 160 may instruct host operating system 150 to display file 130 in the particular display mode chosen by host module 160 in step 240.

Hardware Mechanisms

Figure 3:
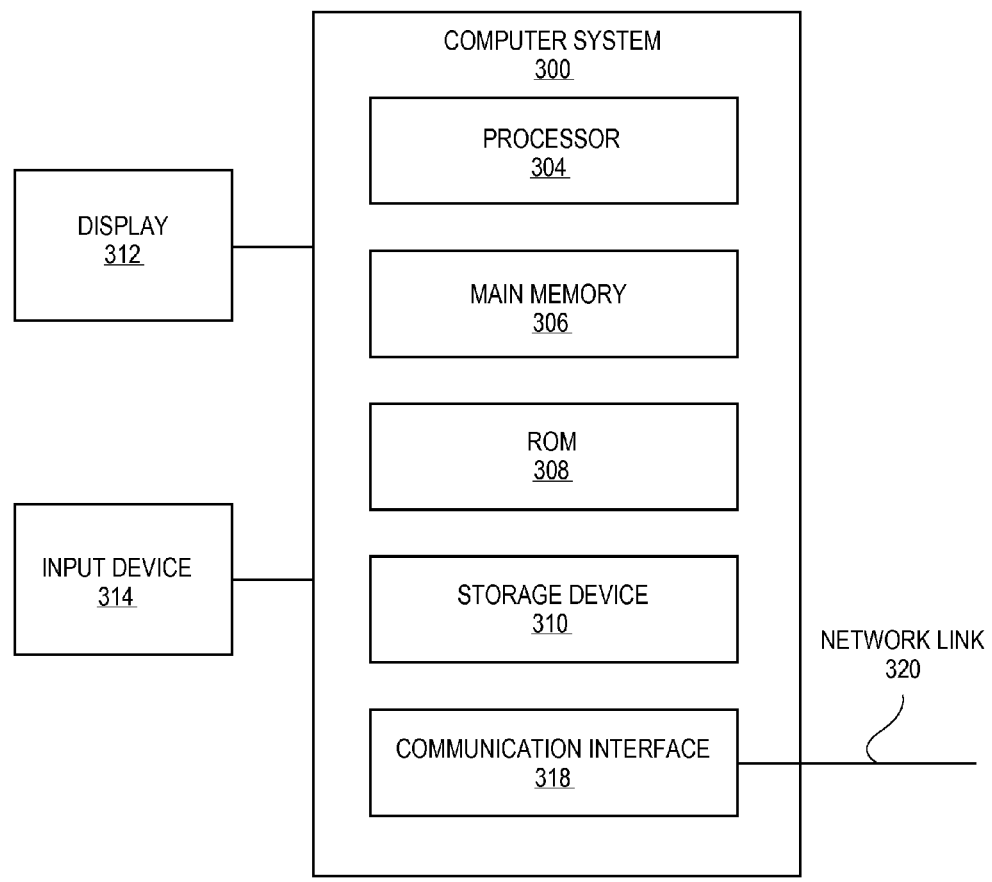
FIG. 3 is a block diagram that illustrates a computer system upon which an embodiment of the invention may be implemented.

FIG. 3 is a block diagram that illustrates a computer system 300 upon which an embodiment of the invention may be implemented. In an embodiment, computer system 300 includes processor 304, main memory 306, ROM 308, storage device 310, and communication interface 318. Computer system 300 includes at least one processor 304 for processing information. Computer system 300 also includes a main memory 306, such as a random access memory (RAM) or other dynamic storage device, for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device for storing static information and instructions for processor 304. A storage device 310, such as a magnetic disk or optical disk, is provided for storing information and instructions.

Computer system 300 may be coupled to a display 312, such as a cathode ray tube (CRT), a LCD monitor, and a television set, for displaying information to a user. An input device 314, including alphanumeric and other keys, is coupled to computer system 300 for communicating information and command selections to processor 304. Other non-limiting, illustrative examples of input device 314 include a mouse, a trackball, or cursor direction keys for communicating direction information and command selections to processor 304 and for controlling cursor movement on display 312. While only one input device 314 is depicted in FIG. 3, embodiments of the invention may include any number of input devices 314 coupled to computer system 300.

Embodiments of the invention are related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 304 for execution. For example, the instructions may initially be carried on a magnetic disk of a remote computer. The remote computer can load the instructions into its dynamic memory and send the instructions over a network link 320 to computer system 300.

Communication interface 318 provides a two-way data communication coupling to a network link 320 that is connected to a local network. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through a local network to a host computer or to data equipment operated by an Internet Service Provider (ISP).

Computer system 300 can send messages and receive data, including program code, through the network(s), network link 320 and communication interface 318. For example, a server might transmit a requested code for an application program through the Internet, a local ISP, a local network, subsequently to communication interface 318. The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A non-transitory computer-readable storage medium that tangibly stores instructions for rendering a file within a configurable display mode, which when executed by one or more processors, cause:

in response to a guest module, executing within a virtual machine, determining that a process executing within the virtual machine is requesting to display the file, the guest module sending a request to display the file to a host module which executes within a host operating system;

upon the host module receiving the request, the host module determining whether a user initiated the display of the file by communicating with a hypervisor to verify that the user initiated the display of the file by performing an operation against the file, wherein the host module determines that the user initiated the display of the file without receiving confirmation from the user;

upon the host module determining that the file is permitted to be displayed, the host module determining a particular display mode for the file; and the host module causing the file to be displayed in the particular display mode.

2. The non-transitory computer-readable storage medium of claim 1, wherein the host module determining whether the user initiated the display of the file comprises:

the host module communicating with a hypervisor to ascertain whether the hypervisor or the host operating system observed the user initiating the display of the file within a configurable amount of time.

3. The non-transitory computer-readable storage medium of claim 1, wherein the particular display mode is a full screen mode or a non-full screen mode.

4. The non-transitory computer-readable storage medium of claim 1, wherein the particular display mode is a cascade screen mode, a tile mode, or a multi-monitor mode.

5. The non-transitory computer-readable storage medium of claim 1, wherein the host module determining a particular display mode for the file based, at least in part, upon the file type of the file.

6. The non-transitory computer-readable storage medium of claim 1, wherein the host module determines that the file is permitted to be displayed by consulting configuration data that describes a set of permissible actions that may be performed against a one or more file types.

7. An apparatus for rendering a file within a display mode, comprising:

one or more processors; and one or more computer-readable medium storing one or more sequences of instructions, which when executed by the one or more processors, cause:

in response to a guest module, executing within a virtual machine, determining that a process executing within the virtual machine is requesting to display the file, the guest module sending a request to display the file to a host module which executes within a host operating system;

upon the host module receiving the request, the host module determining whether a user initiated the display of the file by communicating with a hypervisor to verify that the user initiated the display of the file by performing an operation against the file, wherein the host module determines that the user initiated the display of the file without receiving confirmation from the user;

upon the host module determining that the file is permitted to be displayed, the host module determining a particular display mode for the file; and the host module causing the file to be displayed in the particular display mode.

8. The apparatus of claim 7, wherein the host module determining whether the user initiated the display of the file comprises:

the host module communicating with a hypervisor to ascertain whether the hypervisor or the host operating system observed the user initiating the display of the file within a configurable amount of time.

9. The apparatus of claim 7, wherein the particular display mode is a full screen mode or a non-full screen mode.

10. The apparatus of claim 7, wherein the particular display mode is a cascade screen mode, a tile mode, or a multi-monitor mode.

11. The apparatus of claim 7, wherein the host module determining a particular display mode for the file based, at least in part, upon the file type of the file.

12. The apparatus of claim 7, wherein the host module determines that the file is permitted to be displayed by consulting configuration data that describes a set of permissible actions that may be performed against a one or more file types.

13. A method for rendering a file within a display mode, comprising:

in response to a guest module, executing within a virtual machine, determining that a process executing within the virtual machine is requesting to display the file, the guest module sending a request to display the file to a host module which executes within a host operating system;

upon the host module receiving the request, the host module determining whether a user initiated the display of the file by communicating with a hypervisor to verify that the user initiated the display of the file by performing an operation against the file, wherein the host module determines that the user initiated the display of the file without receiving confirmation from the user;

upon the host module determining that the file is permitted to be displayed, the host module determining a particular display mode for the file; and the host module causing the file to be displayed in the particular display mode.

14. The method of claim 13, wherein the host module determining whether the user initiated the display of the file comprises:

the host module communicating with a hypervisor to ascertain whether the hypervisor or the host operating system observed the user initiating the display of the file within a configurable amount of time.

15. The method of claim 13, wherein the particular display mode is a full screen mode or a non-full screen mode.

16. The method of claim 13, wherein the particular display mode is a cascade screen mode, a tile mode, or a multi-monitor mode.

17. The method of claim 13, wherein the host module determining a particular display mode for the file based, at least in part, upon the file type of the file.

18. The method of claim 13, wherein the host module determines that the file is permitted to be displayed by consulting configuration data that describes a set of permissible actions that may be performed against a one or more file types.

* * * * *